United States Patent

Akiyama

[11] Patent Number: 5,982,356
[45] Date of Patent: Nov. 9, 1999

[54] ERGONOMIC COMPUTER CURSOR CONTROL APPARATUS AND MOUNT

[76] Inventor: Robert Akiyama, 430 Soquel Dr. No. 75, Soquel, Calif. 95073

[21] Appl. No.: 08/950,862
[22] Filed: Oct. 15, 1997
[51] Int. Cl.$^6$ .................................................. G09G 5/08
[52] U.S. Cl. .......................... 345/161; 345/156; 345/163
[58] Field of Search ................................ 345/163, 168, 345/161, 157, 156; 74/471

[56] References Cited

U.S. PATENT DOCUMENTS 5,607,158 3/1997 Chan .................................... 273/148 B
5,790,101 8/1998 Schoch et al. ........................... 345/161

*Primary Examiner*—Richard A. Hjerpe
*Assistant Examiner*—Marthe Y Marc-Coleman
*Attorney, Agent, or Firm*—Jeffrey A. Hall

[57] ABSTRACT

A hand-held ergonomically configured apparatus for manipulating an electronic control signal in a computer, where a mounting element supports an upright support element operably secured to the mounting element and a wrist support for supporting a wrist is positioned on the mounting element. The wrist support is configured to conform to a human wrist for support and comfort. An elongated element adapted for grasping by hand includes a top horizontal surface, a bottom surface, a front wall, a rear wall, an outwardly curved rear surface, and a front surface having a curved grip adapted to be held by a human hand. The elongated element has an aperture on the bottom surface adapted for securing the upright support element therein and a pair of input control buttons are positioned on the front wall and mounted in relation to the curved grip of the front surface so as to allow operation of the pair of input control buttons by an index finger tip and a middle finger tip. A joystick is mounted on the top horizontal surface of the elongated element for controlling a moveable graphic element on a display screen of a computer corresponding to movement or orientation of the joystick in an x-dimension, a y-dimension, and a z-dimension.

12 Claims, 2 Drawing Sheets

ERGONOMIC COMPUTER CURSOR CONTROL APPARATUS AND MOUNT

BACKGROUND OF THE INVENTION

1. Field of Invention

This invention relates to methods and apparatuses for providing a control interface between a human body and a machine, and more particularly to a hand-held control device for controlling and manipulating an electronic control signal to a computer or other electronic device.

2. Description of the Related Art

Various cursor positioning and pointing apparatuses have been proposed and implemented to effect the movement of a cursor on a computer display or other machine. The development of such cursors and pointing apparatuses include trackball, joystick, light pens, touch screens, touch tablets, and mouse type apparatuses. However, most prior apparatuses are significantly limited in that they are isometric in nature, requiring the user to manipulate an object on a resting surface or by a rolling type mechanism. None allow the user to simply move his or her hand in space to position the cursor. For example, mouse type devices require the user to interrupt his or her typing rhythm, look for and grasp the mouse, move it on a clear area of deskspace so as to move the cursor on the screen, and then return to typing. This considerably slows the user's data input and interaction with the graphical interfaces common in computer systems. Use of such prior devices frequently lead to shoulder and arm fatigue and because of the requirements for a rolling or resting surface type movement for the use of such devices may led to serious discomfort and injuries such as carpel tunnel syndrome.

Although a large variety of cursor and related positioning apparatuses have been developed, such significant problems and limitations with prior apparatus significantly limit their application and user performance. In general, all known prior attempts to solve such problems have been problematic, and share the limitations of lack of sensitivity, discomfort and injury to the use, losing one's place on the keyboard, interruptions of the user's typing and input rhythm, and significant stresses on the user due to the unnatural positioning of the shoulders, arm, wrist, and hands while using such devices.

Attempts to solve such problems have met with only limited success. For example, U.S. Pat. No. 4,739,128 issued to Grisham discloses a thumb-controlled, hand-held joystick for video game play, not cursor control, where a manipulandum is contained in a portable housing unit and the joystick extends a short distance form an upper rear surface of the device. Other examples include, U.S. Pat. No. 5,355,147 issued to Lear showing a circularly configured computer mouse, U.S. Design Pat. No. 331,044 issued to Tse for a grip-like configured joystick, U.S. Pat. No. 5,648,798 issued to Hamling for an ergonomic computer mouse/trackball, and U.S. Pat. No. 5,576,733 issued to Lo for a computer mouse device with an upright primary finger-supporting surface. While such devices provide varying degrees of increased comfort to the user, none solve the significant problems with such devices as enumerated above. Such limitations have undoubtedly been a reason these devices have not received widespread acceptance.

Accordingly, it is the primary object of this invention to provide an ergonomic computer cursor control apparatus and mount for controlling a moveable graphic element's movement, speed, and position on the computer or machine display in response to the movement of a users thumb or fingers holding the apparatus allowing for the tracking of two or more degrees of motion or orientation of the human hand moved in proximity to the keyboard. This provides a highly sensitive apparatus whereby a user may reliably select single pixels with a high degree of comfort, accuracy, and repeatability. As the apparatus and mount are ergonomically configured and supported, the stresses and inherent discomforts of all prior devices is eliminated.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a novel apparatus is provided for controlling the movement and speed of a moveable graphic element on a computer or machine display which is highly responsive to the movement of a human hand, is ergonomically configured to be comfortably held in a hand with input buttons located at the index an middle finger tip positions. X and Y and Z-axis movements are controlled by a manipulandum which is a joystick operably mounted on a planar top surface of the apparatus. The apparatus is completely operable with one hand without the need for a rolling or resting surface and eliminates shoulder and arm fatigue as the use can hold it in any position desired. Because the apparatus does not require wrist motion to control a cursor the problems of repetitive stress injuries, carpel tunnel syndrome, and tendinitus are eliminated. Further, the user does not have to hold his shoulder or arm out to maneuver the device, unlike a truckball or mouse, allowing for long term, comfortable use.

In broad terms, the ergonomic computer cursor control apparatus and mount for controlling a moveable graphic element's movement of the present invention are provided by a hand-held ergonomically configured apparatus for manipulating an electronic control signal in a computer, where a mounting element supports an upright support element operably secured to the mounting element and a wrist support for supporting a wrist is positioned on the mounting element. The wrist support is configured to conform to a human wrist for support and comfort. An elongated element adapted for grasping by hand includes a top horizontal surface, a bottom surface, a front wall, a rear wall, an outwardly curved rear surface, and a front surface having a curved grip adapted to be held by a human hand. The elongated element has an aperture on the bottom surface adapted for securing the upright support element therein and a pair of input control buttons are positioned on the front wall and mounted in relation to the curved grip of the front surface so as to allow operation of the pair of input control buttons by an index finger tip and a middle finger tip. A manipulandum or joystick is mounted on the top horizontal surface of the elongated element for controlling a moveable graphic element on a display screen of a computer corresponding to movement or orientation of the joystick or manipulandum in an x-dimension, a y-dimension, and if desired, a z-dimension.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings.

In accordance with the present invention, there is provided a hand-held ergonomically configured apparatus for manipulating an electronic control signal in a computer, where a mounting element supports an upright support element operably secured to the mounting element and a wrist support for supporting a wrist is positioned on the mounting element. The wrist support is configured to conform to a human wrist for support and comfort. An elongated element adapted for grasping by hand includes a top horizontal surface, a bottom surface, a front wall, a rear wall, an outwardly curved rear surface, and a front surface having a curved grip adapted to be held by a human hand. The elongated element has an aperture on the bottom surface adapted for securing the upright support element therein and a pair of input control buttons are positioned on the front wall and mounted in relation to the curved grip of the front surface so as to allow operation of the pair of input control buttons by an index finger tip and a middle finger tip. A joystick is mounted on the top horizontal surface of the elongated element for controlling a moveable graphic element on a display screen of a computer corresponding to movement or orientation of the joystick in an x-dimension, a y-dimension, and a z-dimension.

There is also provided, in accordance with the invention, a hand-held ergonomically configured apparatus for manipulating an electronic control signal, comprising, a substantially flat mounting element with a moveable upright support element operably secured to the mounting element in proximity to support means for supporting a wrist mounted on the mounting element. The support means preferably being configured to conform to a human wrist. An elongated element adapted for grasping by hand includes a top horizontal surface, a bottom surface, a front wall, a rear wall, an outwardly curved rear surface, and a front surface having a curved grip adapted to be held by a human hand. The elongated element has an aperture in the bottom surface adapted for securing the upright support element and a pair of input control buttons positioned on the front wall thereof and positioned in relation to the curved grip of the front surface allowing operation of the pair of input control buttons by an index finger tip and a middle finger tip. A manipulandum or joystick is preferably mounted on the top horizontal surface of the elongated element for controlling an electronic control signal to a computer for manipulation of the positioning and movement of a cursor element.

Figure 1:
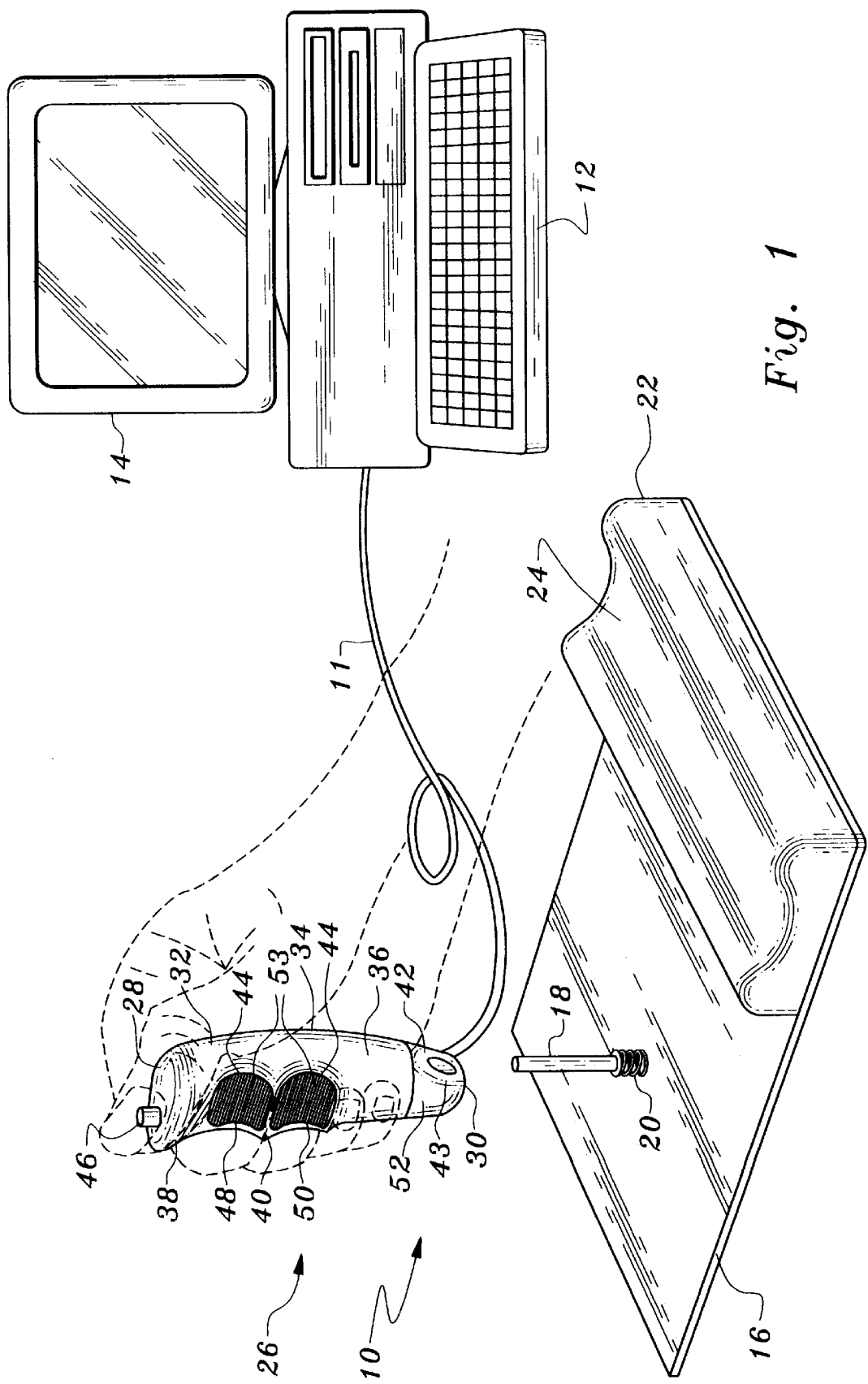
FIG. 1 is a perspective view of the ergonomic computer cursor control apparatus and mount, according to the invention.

In FIG. 1, a hand-held ergonomically configured apparatus for manipulating an electronic control signal in a computer 14 is shown with input cord linkage 11 linked to keyboard 12 and computer 14. Apparatus 10 is preferably operably linked to a computer 14 via linkage 11, however, the apparatus described herein, may also be utilized on other machines, including sensing, locating, and manufacturing machines, as well as other control and data storing and manipulating apparatuses. Alternatively, apparatus 10 may be provided in a wireless embodiment using technology well known in the art.

Apparatus 10 is operably linked to computer 14 or other machine and provide means for accurately translating hand movements and motion into electronic signals for controlling the movement and positioning of a cursor element, for example. Apparatus 10 preferably comprises a substantially planar mounting element 16 which may be composed of rubber, plastic, thermoplastic, neoprene or other durable resilient material. Mounting element 16 has an upright support element 18 secured to mount 16 with spring 20 which allows for movement of upright support element 18 in the forward, sideways and backwards directions.

A wrist support means, preferably wrist support 22 having curved surface 24 is mounted onto mounting element 16 by adhesives, stitches, or mechanical fastening devices such as rivets, or screws at a selected distance, typically from one to 10 inches away from upright support element 18. Curved surface 24 allows for the user to place his or her wrist on rest 22 and have direct support for the wrist and arm allowing for extended use without discomfort.

Figure 2:
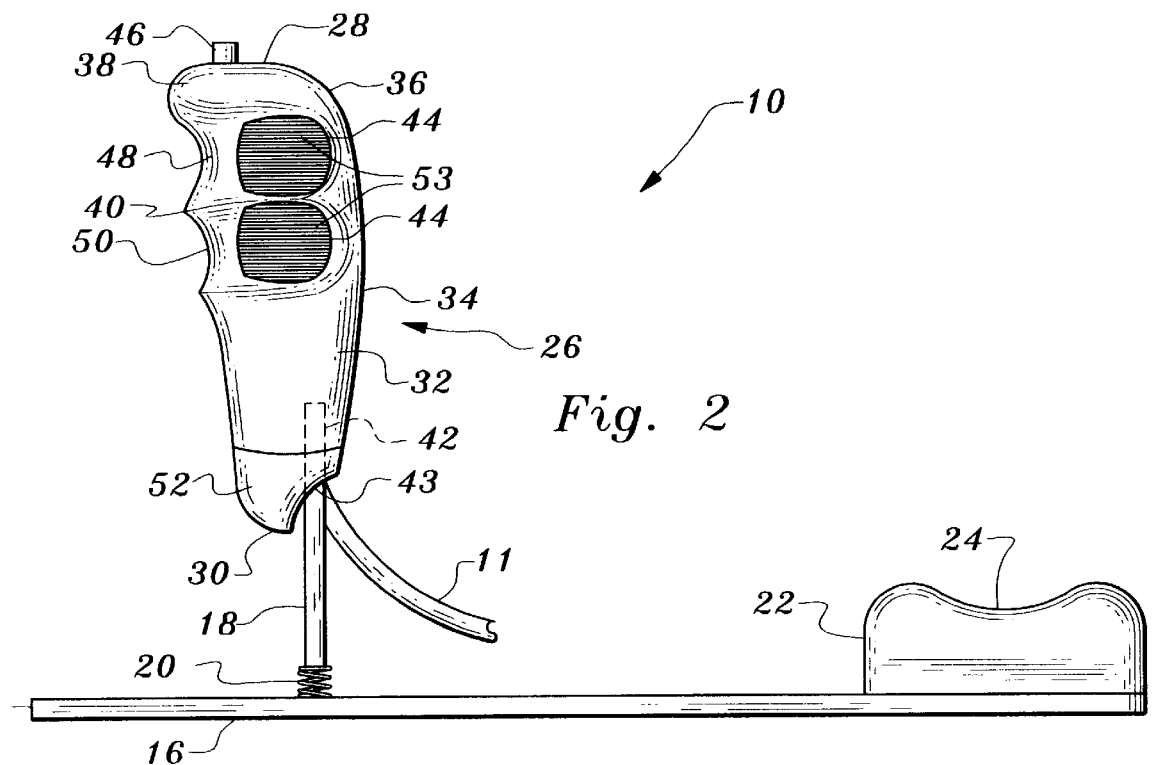
FIG. 2 is a side view of such apparatus separated from the mount, according to the invention.
Figure 3:
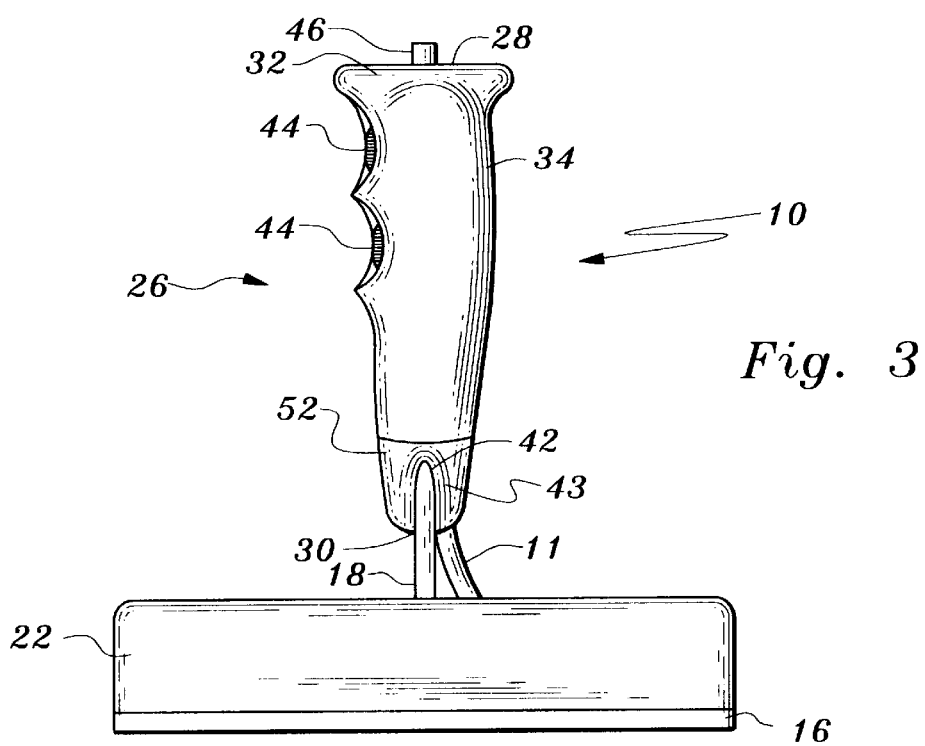
FIG. 3 is a rear view of such apparatus, according to the invention.

As seen in FIGS. 1, 2 and 3, an elongated control element 26 is adapted for grasping by hand and has a top horizontal surface 28, a bottom surface 30, a front wall 32, a rear wall 34, an outwardly curved rear surface 36, and a front surface 38 having a curved grip 40 adapted to be held by a human hand. Curved grip 40 of front surface 38, preferably has first groove 48 configured to conform to the shape of an index finger, and second groove 50 configured to conform to the shape of a middle finger.

Elongated control element 26 is preferably provided with aperture 42 in bottom surface 30 which may be provided with rubber protector 53 to protect the apparatus and the surface it is place on. A curved indentation 43 may be used to surround aperture 42. Aperture 42 preferably extends about 2 inches into elongated element 26 and is used for securing upright support element 18 therein thus holding elongated control element 26 in an upright orientation on mount 16. A pair of input control buttons 44 are positioned on front wall 32 and oriented in relation to curved grip 40 of front surface 38 allowing operation of the pair of input control buttons 44 by an index finger tip and a middle finger tip of a user. The input control buttons may be provided with a curved or grooved upper surface 53 configured to secure or rest a finger therein. The input control buttons 44 being communicativley linked to computer 14 by input cord 11.

As seen in FIGS. 1, 2, and 3, a manipulandum which is in this case a joystick 46, is positioned and operably mounted on top horizontal surface 28 of elongated element 26 for controlling electronic control signals, such as the movement of a moveable graphic element, such as a cursor element on the screen of a computer or other machine. Joystick 46 is operably by the users thumb and preferably about ¼ inches in height, although varying sizes and configurations may be used as desired. Joystick 46 when operated by the users thumb controls the orientation an position of the cursor element, for example, on a computer screen.

The present invention provides a control interface between a moveable object, such as a human hand, and a computer or other machine. In the embodiment described, and as illustrated in FIG. 1, 2, and 3 apparatus 10 is described for ergonomic use by a human hand, wrist, and arm, and the machine is a computer. However, it is clear that the present method and apparatus may be utilized in a wide variety of data transmittal applications. For example, for use with a computer keyboard and computer, or for use with a machine, or for use with a telephone, or for use with a wireless communicator apparatus, and the like. The control interface and method herein described provides means for sensing and signaling the movement of an object in a defined field. Means are provided for transmitting and translating the signals and are coupled to the receiving means which, as previously described may be a computer, machine or other apparatus, means are linked to the transmitting and translating means for producing an input data signal to the computer or machine allowing for the movement of a graphic element, cursor, pointing device or the like, to be moved, positioned, oriented and controlled in a controlled manner.

In operation and use, apparatus 10 is very easy to use, control, and operate, and is very comfortable to use even for extended periods of time. Apparatus 10, with elongated control element 26 which is configured very much like an vertical handle grip and uses thumb control to operate joystick 46 on top horizontal surface 28. From horizontal top surface 28 apparatus 10 preferably tapers to form first groove 48 and second groove 50 and then slopes and tapers to a rounded bottom surface 30 with rubber protector 52. When held in the right hand input control buttons 44 are located on the left side of the handle. The first button is preferably located where the index finger tip naturally rests. The second button is located where the middle finger tip naturally rests. Both input control buttons 44 are grooved 53, shaped, and preferably provided flush with grooves 48 and 50 of front surface 38. This allows for X and Y axis movements to be controlled by joystick 46 and input buttons operated with the index and middle fingers. This eliminates shoulder and arm fatigue as the user can hold and operate apparatus 10 in any position that is comfortable. Because no wrist movement is required to effect cursor movement and control, this eliminates discomfort and carpel tunnel syndrome disorders.

As is evident from the above description, a wide variety control interfaces may be provided by the present invention. Various materials and dimensions may be used and apparatus provided in both a "wired" and a wireless form. Accordingly, additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A hand-held ergonomically configured apparatus for manipulating an electronic control signal in a computer, comprising;

a mounting element;

an upright support element operably secured to said mounting element;

a wrist support means for supporting a wrist mounted on said mounting element; said wrist support means being configured to conform to a human wrist;

an elongated element adapted for grasping by hand having a top horizontal surface, a bottom surface, a front wall, a rear wall, an outwardly curved rear surface, and a front surface having a curved grip adapted to be held by a human hand; said elongated element having an aperture in said bottom surface adapted for securing said upright support element, a pair of input control buttons positioned on said front wall and positioned in relation to said curved grip of said front surface allow operation of said pair of input control buttons by an index finger tip and a middle finger tip; said input control buttons being communicatively linked to said computer; and a joystick mounted on said top horizontal surface of said elongated element for controlling a moveable graphic element on a display means of said computer corresponding to movement or orientation of said joystick in an x-dimension, a y-dimension, and a z-dimension.

2. The hand-held ergonomically configured apparatus for manipulating an electronic control signal of claim 1, wherein said upright support element is secured to said mounting element by a spring allowing for movement of the upright support element.

3. The hand-held ergonomically configured apparatus for manipulating an electronic control signal of claim 1, wherein said pair of input buttons each have a groove in an upper surface configured to secure a finger tip therein.

4. The hand-held ergonomically configured apparatus for manipulating an electronic control signal of claim 1, wherein said aperture of said elongated element extends about two inches within said elongated element.

5. The hand-held ergonomically configured apparatus for manipulating an electronic control signal of claim 1, wherein said front surface of said elongated element has a first groove adapted to conform to the shape of an index finger, and a second groove adapted to conform to the shape of a middle finger.

6. The hand-held ergonomically configured apparatus for manipulating an electronic control signal of claim 1, wherein said apparatus uses wireless means for manipulating an electronic control signal in a computer.

7. A hand-held ergonomically configured apparatus for manipulating an electronic control signal, comprising;

a substantially flat mounting element;

a moveable upright support element operably secured to said mounting element;

a support means for supporting a wrist mounted on said mounting element; said support means being configured to conform to a human wrist;

an elongated element adapted for grasping by hand having a top horizontal surface, a bottom surface, a front wall, a rear wall, an outwardly curved rear surface, and a front surface having a curved grip adapted to be held by a human hand; said elongated element having an aperture in said bottom surface adapted for securing said upright support element, a pair of input control buttons positioned on said front wall and positioned in relation to said curved grip of said front surface allow operation of said pair of input control buttons by an index finger tip and a middle finger tip; and a joystick mounted on said top horizontal surface of said elongated element for controlling an electronic control signal to a computer.

8. The apparatus of claim 7, wherein said upright support element is mounted to said mounting element by a spring allowing for movement of the upright support element.

9. The apparatus of claim 7, wherein said pair of input buttons are configured to secure a finger tip therein.

10. The apparatus of claim 7, wherein said aperture of said elongated element extends about two inches within said elongated element.

11. The apparatus of claim 7, wherein said front surface of said elongated element has a first groove adapted to conform to the shape of an index finger, and a second groove adapted to conform to the shape of a middle finger.

12. The apparatus of claim 7, wherein said apparatus uses wireless means for manipulating an electronic control signal in a computer.

\* \* \* \* \*